April 28, 1953       S. W. MARTIN       2,636,382
BALANCE TESTING DEVICE

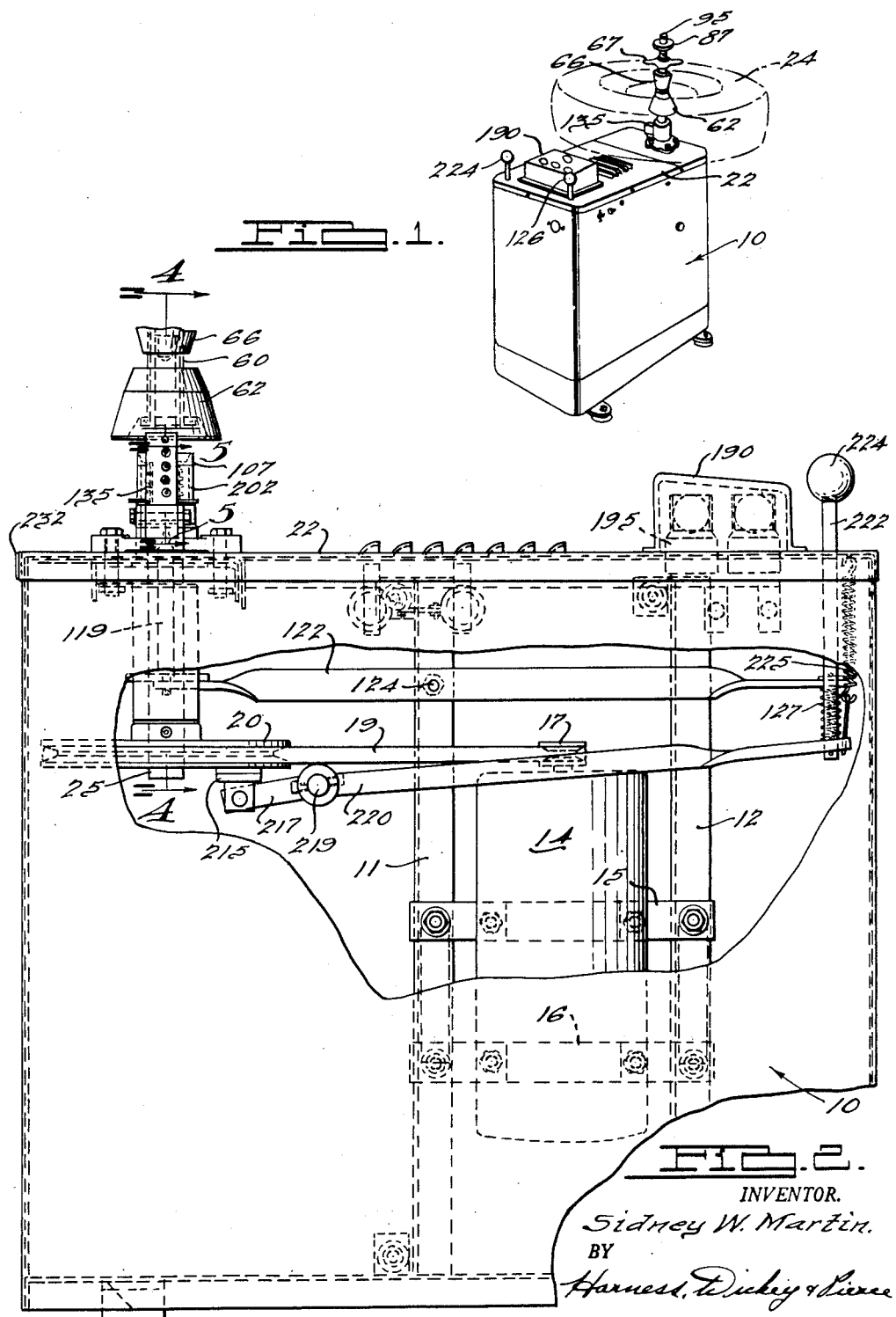

Filed Feb. 14, 1950       3 Sheets-Sheet 2

INVENTOR.
Sidney W. Martin.
BY
Harness, Dickey & Pierce
ATTORNEYS.

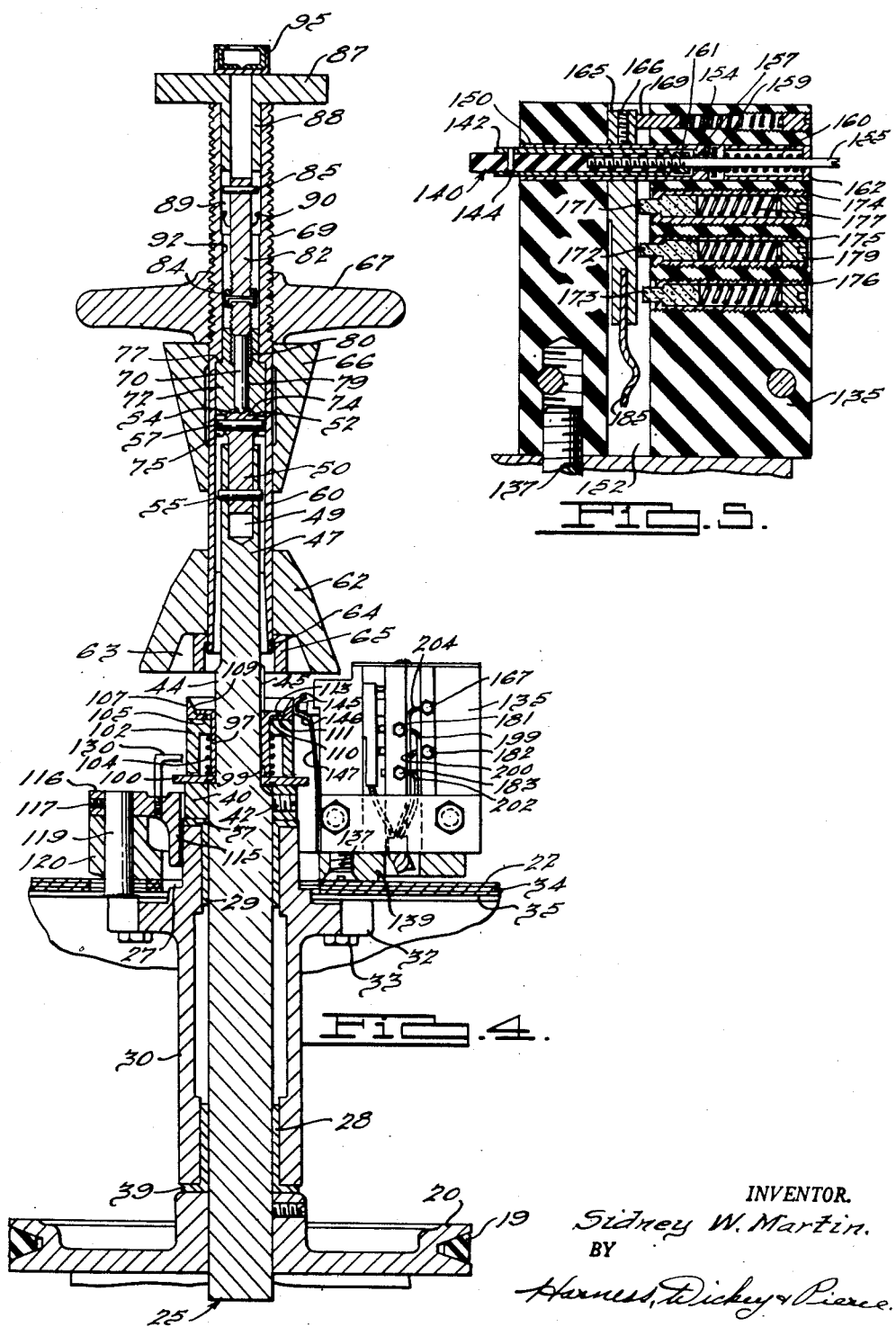

Patented Apr. 28, 1953

2,636,382

UNITED STATES PATENT OFFICE 2,636,382

BALANCE TESTING DEVICE

Sidney W. Martin, Chicago, Ill., assignor to Bear Manufacturing Company, Rock Island, Ill., a corporation of Delaware Application February 14, 1950, Serial No. 144,110

12 Claims. (Cl. 73—66)

The present invention relates to apparatus for determining and evaluating conditions of unbalance in rotatable bodies.

A primary object of the invention is to provide improved and simplified means for quickly and conveniently determining the location and the amount of unbalance, both static and dynamic, which may exist in a vehicle wheel or other rotatable body.

Another important object of the invention is to provide an improved balance-checking device of the indicated character which incorporates easily operable power driven means for rotating the wheel or other object during the gaging of dynamic balance, and which furnishes easily readable visible indication of the location and extent of any unbalanced condition that may exist, the visible indicating means being of such character that it is visible at a distance from the wheel or rotating body.

Still another object is to provide improved apparatus of the indicated character which is of very simple, rugged and foolproof construction, adapted to be incorporated in a single, compact cabinet of relatively small size.

Other objects and advantages of the invention will become apparent upon consideration of the present disclosure in its entirety.

In the drawings:

Figure 1 is a perspective view of a balance gaging structure for motor vehicle wheels, constructed in accordance with the present invention;

Fig. 2 is a side elevational view thereof upon a larger scale and partly broken away;

Fig. 4 is a vertical sectional detail of the wheel supporting structure and indicator actuating mechanism, upon a still larger scale;

Fig. 5 is a vertical sectional view, upon a still larger scale, of the switching means for the electrical indicating means.

Figure 3:
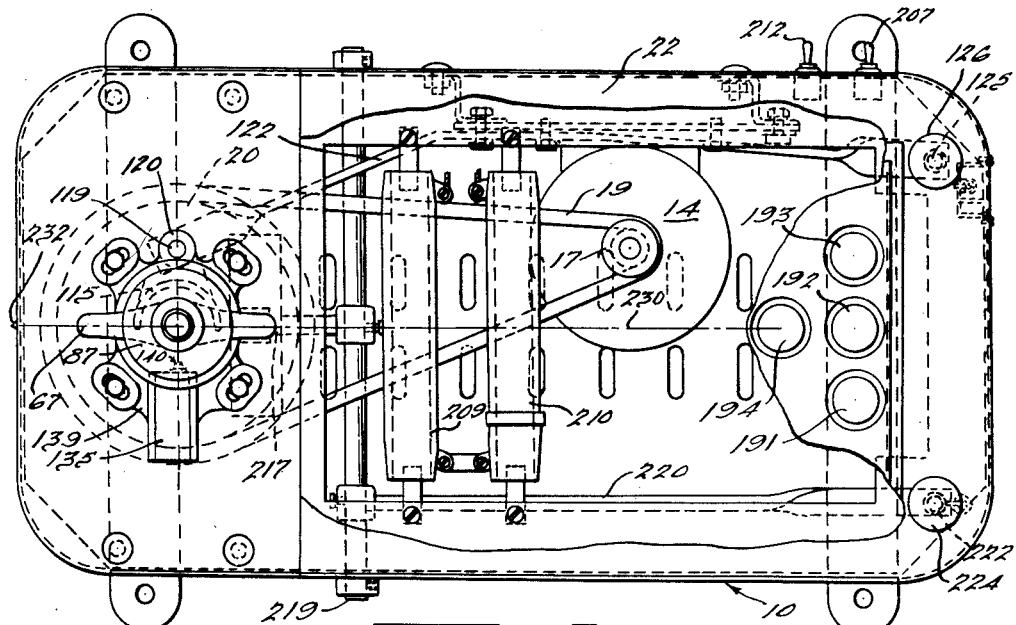
Fig. 3 is a top plan view thereof.
Figure 6:
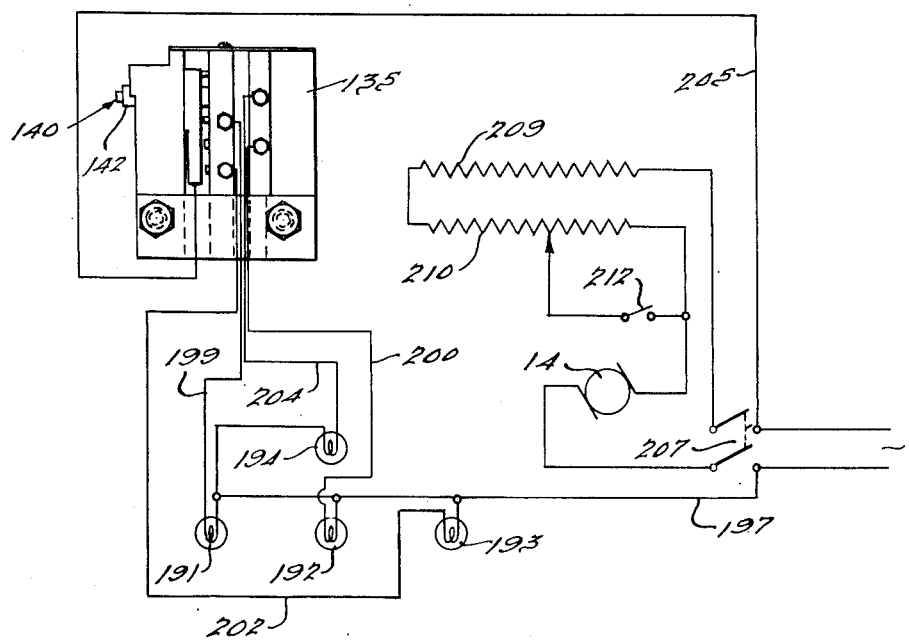
Fig. 6 is a schematic diagram.

Referring now to the drawings, wherein the invention is shown incorporated in a device especially adapted for determining conditions of unbalance in motor vehicle wheels, a cabinet structure is provided which may be of generally rectangular form and economically constructed of sheet metal. The cabinet structure is generally designated 10. In the preferred construction shown, the cabinet is internally braced by upright angle iron members 11, 12 which serve to support an electric motor 14 carried by metallic straps 15, 16, which join and are secured to the uprights 11, 12, and also serve as transverse bracing elements. The motor is mounted with its armature shaft vertical. A pulley 17 is fast upon the armature shaft and a belt 19 provides driving connection between the motor and a pulley 20 through the agency of which a vertical shaft structure, subsequently to be described in greater detail and which projects through the top wall 22 of the cabinet, is rotatable to enable powered rotation of the wheel during the checking of dynamic unbalance. The wheel is tested with tire in place thereon, and is adapted to be supported by the shaft structure above the cabinet in the position indicated at 24 in dotted lines in Fig. 1.

The shaft structure includes a vertical spindle 25 carrying the pulley 20 fast upon its lower end and projecting upwardly through an opening 27 in the top wall 22 of the cabinet. The spindle is rotatably supported in vertically spaced smooth bearing bushings 28, 29, carried by a fixed tubular bearing supporting sleeve and body member 30 having an integral securing flange 32 underlying the top wall of the cabinet and rigidly secured thereto as by screws 33. In the area to which the body 30 is thus secured, the cabinet wall is reinforced as by transverse stiffening and bracing members 34, 35. The bearing bushings 28, 29 are provided with integral thrust bearing flange portions as 37, 39, overlying the ends of the supporting body 30, and directly above the top thrust bearing flange 37, a collar 40 is secured to the shaft as by means of setscrew 42. It will be noted that these portions are located above the top wall of the cabinet.

Above the collar 40, the shaft is provided with a reduced upwardly extending portion 44 having a keyway 45 extending longitudinally thereof, and above portion 44 the shaft is still further reduced, such further reduced portion being designated 47. Section 47 constitutes the upper extremity of the shaft and is provided with a reentrant axially drilled hole 49, in which is fitted a stem portion 50 having at its top an integral hardened steel ball 52. An axially positioned concave conical seat 54 is formed in the top of the ball 52. Stem 50 and ball 52 are locked to the shaft 25 by a transverse keying pin 55, and a pin 57 also extends substantially diametrically and horizontally through the ball 52 and projects from both sides of the ball.

A tubular limitedly rockable driven spindle element or quill 60 is removably supported by the ball 52. The internal diameter of the quill 60 is greater than the external diameter of the portion 47 of the shaft 25 and extends downwardly thereover to a position near the upper extremity of the shaft portion 44.

The quill 60 is adapted to serve as a support for a motor vehicle wheel to be tested, the wheel when supported thereupon being held in such manner that its geometric axis coincides with the axis of the quill. A generally conical abutment or rest 62 is carried by the quill 60 near the bottom, being held against slipping off the bottom of the quill by a snap-type lock ring 64 and an annular skirt ring 65. The rest cone 62 tapers toward a minimum diameter at the top and is slidable on the quill, so that it may be removed to permit the substitution of rests of different proportions, and/or to allow the placement of a spacer between the underside of the cone and the ring 65, if desired. A complementary inverted clamping cone 66 is slidably fitted upon the quill above the cone 62, and is movable toward the bottom cone 62 under pressure adapted to be exerted upon the top of the upper cone by a clamping hand nut 67 fitted upon screw threads 69 formed upon the upper end of the quill. Nut 67 is removable from the quill to permit removal and replacement of the wheel-holding cones 62, 66.

The means for supporting the quill upon the shaft 25 is entirely housed within the hollow interior of the quill, and is so arranged that during static balancing, the quill is adapted to be supported by engagement between the pointed lower extremity of an axially positioned static balance supporting pin 70, carried by the quill, and the conical seat 54 formed in the top of the ball 52. When the quill is supported in this manner, there is no driving engagement between the shaft and the quill, and the quill (and wheel supported thereby) are freely rockable in all directions. During dynamic balancing, the quill and wheel are supported by a socket bearing block 72, also mounted in the quill and having a spherical seat 74 at its lower end which at that time rests upon the spherical surface of the ball 52. The lower end of the socket block 72 is transversely slotted as indicated at 75, such slots being proportioned to fit over the projecting ends of the drive pin 57, so that the block 72, quill, and wheel are rotatable by the shaft. The transverse slotted portions 75 extend substantially above and below the pin 57, so that the block and quill are rockable in all directions, as freely in the vertical plane which contains the pin 57 as in the perpendicular direction corresponding to rotation about the axis of the pin 57.

The axial internal opening in the quill is of maximum diameter from the open lower end thereof to a plane just above the socket block 72, where the diameter of the internal opening is reduced to define a shoulder 77 which positions the block against upward displacement. The pin 70 is slidable in an axial hole 79 in the block. Near its upper end the axial hole 79 is somewhat enlarged and tapped to provide an internally threaded nut portion 80 into which the upper end of the stem 70 projects. An axially positioned screw 82 is threaded at its lower end and fitted into the threads in the nut portion 80 and is held in substantially axial position within the quill by a spacing and stop collar 84 surrounding and pinned or otherwise secured to the screw. Near its upper end, which lies within and is spaced below the top of the quill, the screw carries a transverse drive pin 85 extending laterally therefrom. The screw 82 is rotatable by means of a handwheel 87 having an integral tubular stem portion 88 projectable into the top of the quill and diametrically slotted at its lower end as indicated at 89. The tubular stem portion is slidably fitted over the upper end of screw member 82 and the slotted portion 89 is dimensioned to overengage the drive pin 85. The handwheel overlies the top of the quill when the stem is inserted in the manner shown in Fig. 4, and accidental displacement of the handwheel and stem is prevented by a friction snap ring 90, mounted upon and near the lower end of the stem and held in a suitable groove in the exterior of the stem, but bearing frictionally outwardly against the interior of the quill. The spring ring 90 is slidable in the smooth cylindrical upper portion 92 of the hole in the quill, but the internal diameter of the ring is too small to permit the projecting ends of the pin 85 to pass through it, so that when the screw 82 is completely released from the nut portion 80 of the block 72, the screw may be removed with the handwheel 87 and stem 88 simply by lifting up on the handwheel and pulling it out of the top of the quill, the ring 90 serving to pull out the screw 82.

In axial position on top of the handwheel 87 is a universal-type spirit level or inclinometer assembly 95 which may comprise a substantially cylindrical fluid-tight casing having a circular top window of upwardly convexed form and containing in the usual manner an air bubble floating in the liquid therein.

When the screw 82 is backed off sufficiently, for example, as shown in Fig. 4, the load represented by the quill and a wheel carried thereby is transmitted through the shoulder 77 and block 72 to the spherical top surface of the ball 52 and at such time the quill and wheel are drivable from the shaft 25 through pin 55, stem 50, pin 57 and block 72 to the quill. The block 72 is fast in the quill. As previously noted, the wheel under test and the quill are universally rockable during such rotation, by virtue of the universal joint furnished by the ball and socket portions 52 and 74.

When the screw 82 is forced into the nut portion 80, in response to rotation of the handwheel 87 while the wheel under test and the quill are held against rotation, the nut portion 80 and socket block 72 are lifted upon the pin 70, raising the entire quill and wheel, and such action may be continued until the slotted portion 75 is entirely free of the pin 57. The socket portion 74 is then also free of the ball 52 and the entire quill and wheel assembly is supported by the pointed lower end of the pin 70 which then bears against the conical seat 54 in the top of the ball. The wheel and quill are then rockable with minimum friction, although no rotary drive can be imparted thereto.

Slidably keyed to the shaft portion 44 between the collar 40 and the lower end of the skirt 65 is an indicator switch actuating mechanism responsive to dynamic unbalance. The indicator actuating assembly includes a sleeve 97 slidably fitted upon the shaft, but keyed against rotation with respect thereto as by means of a keying portion 99 slidably projecting into the keyway 45. Secured to the lower end of the sleeve 97 is an abutment and bearing disk 100. Loosely fitted over the sleeve 97 is an inverted cup-shaped housing portion 102, the exterior of which is substantially cylindrical. Housing 102 is smaller in diameter than the disk 100 and the lower edge of the housing substantially abuts the disk 100, although the disk 100 and sleeve 97 are urged downwardly with respect to the cupped housing by the compression spring 104 surrounding the sleeve within the housing and bearing downwardly against the disk and upwardly against the flat top wall 105 of the housing.

Mounted on the flat top wall 105 of the housing 102 in such manner as to be laterally slidable thereover, but frictionally held in any position of lateral adjustment to which it may be moved, is a ring 107 having an upwardly facing socket-like opening defined by a wall 109 of truncated conic form. The mean diameter of the wall 109 is preferably substantially equal to the outside diameter of the skirt 65, and the ring 107 is adapted to be moved upwardly with the housing cup 102 until the wall 109 engages the circular outer lower corner of the skirt 65. It will be appreciated that in this manner, if the quill is tilted with respect to the shaft so that skirt 65 is not concentric with the axis of the shaft, the ring 107 will be shifted laterally to a conformable extent by camming action between the lower corner of the skirt 65 and the sloping conic wall 109 of the ring 107. The central opening 110 in the ring 107 is large enough to permit lateral shifting of the ring to the extent of the maximum possible tilted inclination of the quill. Contiguous with the bottom face of the ring 107 is a radially inwardly extending flange 111 of relatively thin flat form, and the inner edge of which defines the opening 110. A flat radially outwardly extending flange 113 is rigidly carried by the upper end of the sleeve 97, and is shown formed integrally therewith. The spring 104 urges the top flange 105 of the cup 102 upwardly against the bottom of the flange 111, and urges the sleeve flange 113 downwardly against the top of flange 111, so that the ring is frictionally held against lateral shifting movement, but since all of these parts are flat and smooth, the ring is laterally shiftable by the exertion of a predetermined force thereupon, and the force required to move the ring 107 in this fashion is uniform throughout its range of movement.

The dynamically shiftable ring 107 and the supporting structure therefor, just described, may be bodily shifted upwardly by means of a forked yoke 115, freely encircling the collar 49 below the disk 100 and movable upwardly against the bottom of the disk to force the disk and the dynamic ring assembly upwardly. The yoke has a hub portion 116 secured by a setscrew 117 to a vertically slidable rod 119 which projects downwardly through a fixed bearing support 120 into the interior of the cabinet. Within the cabinet, the lower extremity of the rod 119 is articulated to the end of a lever 122 which extends longitudinally through the cabinet to a position near the opposite end thereof. Intermediate its ends, the lever 122 is pivoted upon a pivot pin 124 carried by the upright 11, and at its end opposite to the point of articulation to the rod 119 the lever is connected to a substantially vertical rod 125 which extends upwardly through the top wall of the cabinet and to a position spaced thereabove where it carries a handle ball 126. The yoke 115 is urged downwardly by a compression spring 127 which bears upwardly against that end of the lever 122 remote from rod 119, the opposite end of said spring bearing upon a portion of the cabinet (not shown). The yoke 115 also carries a hook 130 rigidly secured thereto and extending upwardly to a position spacedly above the disk 100 and then radially inwardly so that it overlies the disk.

Carried by the top of the cabinet and positioned to be actuated by the ring 107 and to indicate the lateral displacement thereof is an electrical switching assembly, the body of which is generally designated 135, and the details of construction of which are best shown in Fig. 5. The body 135 of the switch is formed of insulating material and it is secured to the top of the cabinet as by screw means 137 serving to attach it to the upper surface of a clamping and positioning ring 139 surrounding the shaft and the tubular shaft supporting housing 30 above the cabinet. Ring 139 forms a complementary securing element for coaction with clamping flange 32, the screws 33 extending upwardly through flange 32 and through the bracing elements 35, 34, cabinet top panel 32, and into the ring 139. The bearing portion 120 for the rod 119 may also be formed as an integral extension of the ring 139 as shown in Fig. 4.

The switch body 135 carries a contact plunger 140. The plunger is horizontally slidable in the block-like body substantially in horizontal alignment with the position of the dynamically displaceable ring 107 when the latter is in its lowered position, the plunger projecting to a position to be actuatable by the ring. The plunger is of composite construction, consisting of a central stem or core portion formed of insulating material and to which the reference numeral 140 is applied, and a metallic tube element 142 encircling the core portion and secured thereto as by the pin 144, but stopping short of the outer extremity of the core. The projecting end of the plunger assembly is covered by a sheet metal strap element which serves as a camming device and also to protect the plunger. The strap element incorporates inclined top and bottom camming wall portions 145, 146 formed integrally with a substantially vertical supporting leaf portion 147 secured at its lower end to the wall of the casing 135 which faces the shaft assembly. The sloping wall 145 is so inclined as to assist in camming the plunger inwardly during downward movement of the dynamic cone ring 107 after lateral deflection of such ring under the influence of dynamic unbalance, as will be more fully explained.

The plunger assembly 140, 142 is limitedly slidable in a metallic bearing tube 150 in the body 135. Tube 150 concentrically encircles the plunger assembly and is also slidable in the body 135 and extends transversely across a vertically intersecting slot 152 in the body. To the right of the slot 152, as the parts are viewed in Fig. 5, the sleeve 150 is provided with an inwardly extending flange 154 which is also located spacedly to the right of the plunger portions 140, 142. A relatively long adjusting screw 155 is axially threaded in a tapped hole in the rear end of the insulating plunger core portion 140 and extends from the right end of the body 135. An insulating bushing 157 surrounds the portion of the screw 155 which projects through the flange 154. Mounted upon the screw at the right end of the bushing 157 is an abutment washer 159 and behind the abutment washer is a compression spring 160 arranged upon the screw and reacting to the left against the washer and to the right against a retainer cup 162 fast in the body 135. The insulating core portion 140 projects to the right slightly beyond its surrounding sleeve portion 142. Secured to the screw between the core portion 140 and the flange 154 is a metallic contact collar 161 which is shorter in an axial direction than the space between the core 140 and flange 154 when the plunger is fully projected.

An arm 165 is secured by a setscrew 166 to the sleeve 150 within the slot 152, the arm being narrower than the slot in a direction parallel to the axis of the plunger, so that the arm is movable with axial displacement of the sleeve 150. A combined electrical terminal and setscrew 167 provides for electrical connection to the metallic retainer cup 162 and locks the latter in place. The arm 165 and sleeve 150 are urged to the left as the parts are viewed in Fig. 5 by a spring-pressed plunger 169. When moved to the right, the arm 165, which constitutes a switch contact arm, is adapted to successively engage a plurality of plungers, arranged in spaced superposed relation in the switch body and slidably projectable in horizontal paths into the slot 152, although mounted in such manner that they project into such slot for limited distances only and to varying extent. The top plunger, designated 171, projects farthest into the slot, plunger 172, next therebeneath, projects into the slot a lesser distance, and the lowermost plunger 173 projects into the slot for the shortest distance. The plungers are formed of suitable conductive material such as carbon, and each is slidable in a metallic tube as 174, 175, 176, externally threaded and fitted into a conformably threaded opening in the body. The plungers are urged into the slot by compression springs as 177 arranged behind each plunger, and each spring is in turn retained by a plug 179 fitted in the rear end of the plunger sleeve. Electrical connection to each of the plungers is adapted to be effected by means of terminal screws as 181, 182, 183, extending through the side of the body and adapted to serve both as terminal means and as setscrews for locking the respective plunger sleeves 174, 175, 176 in place. Electrical connection is also adapted to be made to the switch contact arm 165 by means of a flexible pigtail connector 185.

It will be noted that the supporting structure for the wheel in the test, the electrical switching mechanism, and related components thus far described are located near one extremity of the cabinet, and that the actuating handle 126, previously referred to, is located near the other end of the cabinet. The last-mentioned end of the cabinet, shown at the right in Figs. 2 and 3, constitutes the operator's station and the design is such that all controls and indicating means may be located at this end of the cabinet. Secured to the top of the cabinet near the knob 126 is an indicator housing 190 within which are four electric light bulbs 191, 192, 193, 194, visible through appropriately positioned window openings (undesignated) formed in the top of the housing 190. The bulbs are mounted in individual lamp sockets as 195. One terminal of each of the lamp sockets is connected to a conductor 197. The other terminal of the socket for lamp 191 is connected by a conductor 199 to the terminal 181 for plunger 171. The other terminal of the socket for lamp 192 is connected by a conductor 200 to the terminal 182 for the plunger 172, and the other terminal of the socket for lamp 193 is connected by a conductor 202 to the terminal 183 for the plunger 173. The other terminal of the socket for lamp 194 is connected by a conductor 204 to the terminal 167, which is connected to the retainer cup 162 for the plunger assembly 140, 142. The conductor 185, comprising the pigtail connector 185 previously mentioned, is connected by means of a conductor 205 to the other voltage supply line. The voltage supply may comprise the conventional 110 volt commercial supply or any other suitable current source. As also shown in Fig. 5, the motor 14 may be operable upon the same current supply. The motor is of a variable speed-type and is shown as connected through a conventional double pole, single throw switch 207 to the current source, one terminal of the motor being connected in series with a fixed resistor 209 and an adjustable resistor 210. A part of the adjustable resistor is adapted to be short-circuited by a single pole, single throw switch 212 which is biased by spring means, not shown, to the open position, but which is adapted to be closed to short-circuit the resistance and increase the voltage fed into the motor for short periods to increase its torque to assist rapid acceleration.

To enable stopping a wheel under test rapidly, a brake mechanism is incorporated comprising a brake shoe 215 adapted to frictionally engage the flat bottom surface of the pulley 20. The brake shoe is carried by a lever arm 217 secured to a rockshaft 219 actuatable by another lever arm 220 which extends to the control position previously mentioned at the opposite end of the cabinet, where it is articulated to a vertically slidable rod 222, which projects upwardly through and above the top of the cabinet carrying at its top a handle ball 224. The handle end of lever 220 is urged upwardly by a tension spring 225 reacting upwardly upon such end of the lever and thereby urging the brake shoe out of engagement with the bottom braking surface of the pulley 20. It will be seen that by bearing down upon the handle ball 224, the shoe may be forced into engagement with the pulley to arrest rotation of the shaft 25, and thereby of a wheel under test.

It is believed that the operation of the device during static balance testing will be obvious from the foregoing. The wheel to be tested is installed by first removing handwheel 87 and the connected parts, and by also removing the hand nut 67 and the top cone 66, placing the wheel upon the bottom cone 62, reapplying the top cone 66 and hand nut 67 and tightening the latter. The handwheel 87 and screw 82 are then reinserted and the handwheel is turned to the right as far as possible to lift the socket block 72 and the entire quill and supported wheel under test until the entire quill and wheel supporting assembly is carried only by the pin 70 resting in the socket 54. The inclinometer assembly 95 will then indicate static unbalance, which can be corrected in the usual manner by applying suitable weights to the wheel, as by attaching them to the rim. If there is substantial static unbalance, I prefer to apply half the required weight to each side of the rim, to avoid the introduction of dynamic unbalance.

After static balance is corrected so that the bubble is centered in the inclinometer glass, the handwheel is turned in the opposite direction to back-off the screw 82 and to allow the quill and socket block to move downwardly, until the socket 74 in the block is seated on the spherical surface of the ball and the pin 70 is free of the seat 54. The pin is preferably formed integrally with the screw 82, and the pin, screw and handwheel assembly may be completely removed and placed to one side during the subsequent dynamic balance checking operations.

To check dynamic balance, the motor switch 207 is turned on and the wheel brought up to speed. Any dynamic unbalance existing will manifest itself in a tilting of the wheel and quill about some transverse axis which extends through the center of the ball 52 and which rotates with the wheel. This will cause the skirt 65 to move in an orbit. The radius of the orbit is a measure of the extent of dynamic unbalance, and the position of the axis of tilt with respect to the shaft and wheel furnishes an indication as to the location of the dynamic unbalance.

With the wheel rotating in the tilted condition so that it appears to wobble, the handle knob 126 is pressed downwardly to force the carrier 102 and the dynamically shiftable cone ring 107 upwardly until the conical face 109 of the latter engages the bottom of the skirt 65. The ring 107 is, as previously noted, rotating at the same speed as the wheel and ring 65, but the offset position of the skirt due to the dynamic unbalance exerts a camming action on surface 109 to shift the ring 107 to a correspondingly offset position. It will be noted that when the carrier 102 is moved upwardly in the described manner, the upward force exerted by the yoke 115 upon the disk 100 tends to move the flange 113 upwardly away from the flange 111 of the shiftable ring 107, so that the ring is readily shiftable by the skirt. When the knob 126 is released, however, to allow the carrier and shiftable ring to descend, the spring 104 becomes fully effective to cause the flange 113 to grip the ring flange 111. Also during such downward movement of the carrier, the hook 130 may engage the top of disk 100 to pull the bushing 97 downwardly, thereby increasing the gripping effect as the laterally deflected and rotating ring 107 is pulled downwardly over the sloping surface 145 of the plunger actuating leaf member 147. Thereafter, during continued rotation of the wheel and shaft, the ring 107 describes an eccentric path and actuates the plunger 149 inwardly once during each revolution.

During the initial part of each inward movement of the plunger, the contact collar 161 is moved into engagement with the flange 154 to complete a circuit through the conductor 204 to the locating lamp 194. If the extent of dynamic unbalance is sufficient to cause the arm 165 to move into engagement with one or more of the plungers 171, 172, 173, the lamp or lamps connected to the plunger or plungers so engaged will also be intermittently illuminated. By reason of the fact that the plungers 171, 172, 173 are formed of carbon, the current transmitted therethrough, and consequently the brightness of illumination of the lamp connected to each plunger, varies in proportion to the pressure between the arm 165 and the plunger, in each case, in a readily observable manner. Thus, if the dynamic unbalance is of such degree as to cause the arm 165 to depress the plunger 171 and to engage the plunger 172 with relatively light pressure, the locating lamp 191 connected to plunger 171 will be illuminated at full brilliance, but the locating lamp 192 will be illuminated at reduced intensity. The parts may be so calibrated that the full illumination of lamp 191 indicates dynamic unbalance of such order as to require the application of corrective weights of approximately one ounce each at diametrically opposed positions and opposite faces of the rim of a motor vehicle wheel which is of approximately the usual dimensions, while full illumination of lamp 192 connected to plunger 172 indicates a need for two ounce correcting weights, and full illumination of lamp 193 connected to plunger 173 denotes unbalance requiring three ounce correcting weights. The switching mechanism causes the simultaneous illumination of all of the lamps up to and including the one denoting the highest weight required. Whenever more than one of the weight-indicating lamps 191, 192, 193 is illuminated and the illuminated lamp corresponding to the highest weight is lighted with reduced intensity, however, the operator is able to determine that, for example, only one-half ounce of additional weight is indicated by the highest weight lamp so illuminated at reduced intensity.

After noting the amount of weight required to correct the unbalance in the manner indicated, the motor switch is opened and the wheel brought to rest, with the assistance of the brake mechanism, if desired. The wheel is then rotated slowly by hand, clockwise, as viewed from above, until the locating lamp 194 is illuminated. Slow rotation of the tire in the same direction is continued until the locating lamp just goes off. This will correspond to the position at which the most eccentrically positioned portion of the shifted ring 107 has moved away from the plunger actuating blade 147 sufficiently to allow the plunger assembly to move to the left until the contact collar 161 has moved slightly away from the flange 154. A mark is placed upon the tire at the point closest to the locating light 194 (which is positioned on the longitudinal center line 230 of the top of the cabinet). The mark thus lies on a straight radial line between the center of the wheel and the lamp 194. Thereafter, the wheel is further turned slowly by hand, in the same direction, until the locating light again just comes on. This usually occurs when the wheel has been rotated one-half revolution from the position at which the mark on the tire was aligned with the locating light. The ring 107 is of the same diameter as the housing 102, and the contact 161 for the locating light is closable in response to very slight travel of the plunger. The outwardly offset part of the shifted ring 107 is in engagement with the plunger actuator blade 147 throughout a half revolution, and since even very slight eccentricity of the ring 107 is sufficient to cause illumination of the locating light in the manner described, the lamp remains illuminated during approximately one-half revolution, unless the ring has only been shifted to a very slightly eccentric position. Thus the angular positions corresponding to the points at which the outwardly offset part of the ring ends, correspond to the positions at which the locating light goes on and off, and such positions also define the ends of a transverse diameter which is parallel to the axis about which the wheel is tilted in response to dynamic unbalance. It will also be observed (Fig. 3) that the switch mechanism carried in the casing 135 is arranged at 90° to the longitudinal center line 230, previously referred to, connecting the locating lamp 194 with the center of the shaft assembly, so that when the wheel is stopped with the tire mark at the opposite end of a diameter extending in the indicated direction parallel to the center line 230, the axis of tilt is actually located in a perpendicular direction, and extends through the shaft assembly at 90° to such center line, that is, parallel to the axis of the plunger assembly 140. The correcting weights can accordingly be applied to the wheel at the ends of the marked diameter, that is, one weight to the underside of the rim in radial alignment with the point marked on the tire, and the other weight at the opposite side of the wheel, 180° away, but on top of the rim.

Referring again to Fig. 3 and considering the relative positioning of the axis of the switch plunger 140 and the axis represented by the cabinet center line 230 previously referred to, it will be seen that the tire mark, applied in the manner indicated, will be located at the point of the wheel which was lowest during the dynamic balance test. Thus the correcting weight is applied to the underside of the rim in radial alignment with the mark on the tire and to the top of the rim 180° away. Preferably, the indicator light mechanism is so calibrated with relation to the average dimensions and mass of vehicle wheels of the class to be tested that the amount of weight denoted by indicating lights, in the manner previously described, should be applied to both sides of the rim in order to effect correction of the dynamic unbalance.

To assist in locating the axis of tilt in the manner described, a vertical center line or marking may be formed on the end of the cabinet in alignment with the axis 230. In the shown construction, such vertical end marking may comprise a trim strip 232.

It will be appreciated that when the dynamic unbalance is slight, the shiftable ring 107 may not be displaced sufficiently to cause the plunger to be actuated so that the positions at which the locating light goes on and off are exactly 180° apart. If this is the case, it will be found that after the tire is marked to indicate the position at which the locating light goes off, more than 180° of subsequent rotation will be required to cause the light to come on, so that the marked position of the tire will not then line-up with the rib 232 at the position where the light comes on. In this event, when the light does come on, the wheel is stopped in the same manner, and the correcting weight is installed upon the underside of the rim at a position midway between the tire marking and the vertical rib 232. A like weight is thereafter installed on top of the rim 180° from the bottom weight.

While it will be apparent that the preferred embodiments of the invention herein disclosed are well calculated to fulfill the objects above stated, it will be appreciated that the invention is susceptible to modification, variation and change without departing from the proper scope or fair meaning of the subjoined claims.

What is claimed is:

1. Apparatus for checking the dynamic balance of motor vehicle wheels and the like, comprising in combination with a rotatable spindle, a wheel supporting quill drivably supported by, but rockable with respect to, said spindle, whereby during rotation of the quill, while the quill is carrying a dynamically unbalanced wheel, the wheel and quill may tilt about a transverse axis substantially perpendicular to a radial plane which extends through the center of the dynamically unbalanced mass, a camming portion carried by the quill, a laterally shiftable indicator actuator rotatably drivable by the spindle but slidable therealong to and from engagement with said camming portion, coacting camming portions carried by said actuator and engageable with said first-mentioned camming portion to shift said actuator laterally to a position corresponding to the position of said first-mentioned camming portion, gripping means for holding said actuator in a laterally shifted position to which it has been so moved by said first-mentioned camming portion, and gaging means operatively connectable to said shiftable actuator.

2. Apparatus as defined in claim 1 wherein the spindle is rotatable on a substantially vertical axis and the quill is universally rockable on the spindle and includes a skirt portion spacedly below the point of rockable support of the quill and spacedly surrounding the spindle, said first-mentioned camming portion being carried by said skirt portion.

3. Apparatus as defined in claim 1 wherein the indicator actuator comprises a ring having an inclined camming face engageable with said first-mentioned camming portion, a generally cylindrical ring support of substantially the same external diameter as said ring, the ring and support being bodily slidable on the spindle and the ring being laterally shiftable with relation to the support, said gripping means being carried by said support.

4. Apparatus as defined in claim 1 wherein the spindle is rotatable on a substantially vertical axis and the quill is universally rockable on the spindle and includes a skirt portion spacedly below the point of rockable support of the quill and spacedly surrounding the spindle, said first-mentioned camming portion being carried by said skirt portion, a support slidably keyed to the spindle and carrying the indicator actuator, said gripping means being carried by said support.

5. Apparatus as defined in claim 1 wherein the spindle is rotatable on a substantially vertical axis and the quill is universally rockable on the spindle and includes a skirt portion spacedly below the point of rockable support of the quill and spacedly surrounding the spindle, said first-mentioned camming portion being carried by said skirt portion, a support slidably keyed to the spindle and carrying the indicator actuator, said gripping means being carried by said support, and means operatively connected to the support and to the gripping means for moving the support along the spindle to carry the actuator to and from engagement with the skirt and to vary the effect of the gripping means.

6. Apparatus as defined in claim 1 wherein the spindle is rotatable on a substantially vertical axis and the quill is universally rockable on the spindle and includes a skirt portion spacedly below the point of rockable support of the quill and spacedly surrounding the spindle, said first-mentioned camming portion being carried by said skirt portion, a support slidably keyed to the spindle for axial movement therealong and carrying the indicator actuator, said actuator comprising a ring having a substantially flat flange engaging and laterally shiftable with respect to the support in a path transverse to the spindle axis but bodily axially movable with the support, said gripping means being carried by said support and engageable with said flange.

7. Apparatus as defined in claim 1 wherein the spindle is rotatable on a substantially vertical axis and the quill is universally rockable on the spindle and includes a skirt portion spacedly below the point of rockable support of the quill and spacedly surrounding the spindle, said first-mentioned camming portion being carried by said skirt portion, a hollow cylindrical support slidably keyed to the spindle for axial movement therealong and carrying the indicator actuator, said actuator comprising a ring having a substantially flat flange engaging and laterally shiftable with respect to the support in a path transverse to the spindle axis but bodily axially movable with the support, said gripping means being carried by said support and engageable with said flange, and including a flange-engaging friction element extending into the interior of said hollow cylindrical support, and spring means within the support reacting against said friction element.

8. In a gaging device for determining conditions of dynamic unbalance in rotatable bodies, in combination with a rotatable spindle, a wheel support carried and rotatably drivable by the spindle but universally rockable with respect thereto, an element carried by the spindle in circumscribing relationship thereto, said element being rotatable with said spindle and shiftable laterally with respect thereto to positions of varying eccentricity with relation to the axis of the spindle, said element being operatively connectible to and shiftable by the wheel support, and electrical contact means operable by said shiftable element, including a contact closable in response to slight eccentric shifting movement of said element and a plurality of contacts progressively closable in response to successively greater degrees of eccentricity of said element.

9. In a gauging device for determining conditions of dynamic unbalance in rotatable bodies, in combination with a rotatable spindle, a wheel support mounted upon and rotatably drivable by the spindle but universally rockable with respect thereto, an element separate from said wheel support mounted upon and rotatable with said spindle, said element being laterally shiftable at right angles to the axis of said spindle, means carried by said wheel support for laterally shifting said separate element in proportion to rocking of said support, and means for determining the extent of shifting movement of said element comprising a plunger engageable with said element, and a series of electrical contacts operable by said plunger.

10. In a gauging device for determining conditions of dynamic unbalance in rotatable bodies, in combination with a rotatable spindle, a wheel support mounted upon and rotatably drivable by the spindle but universally rockable with respect thereto, an element separate from said wheel support and mounted upon and encircling and rotatable with the spindle but shiftable laterally of the spindle to positions of varying eccentricities with relation to the axis of the spindle, means carried by said spindle for constraining movement of said element in a single plane only, said element being operatively connectible to and shiftable by the wheel support.

11. In a gauging device for determining conditions of dynamic unbalance in rotatable bodies, in combination with a rotatable spindle, a wheel support mounted upon and rotatably drivable by the spindle but universally rockable with respect thereto, a ring mounted upon and encircling and rotatable with the spindle but shiftable laterally of the spindle to positions of varying eccentricity with relation to the axis of the spindle, said ring being separate from and shiftable by the wheel support, and gripping means carried by said spindle and frictionally bearing upon said ring for constraining movement of said ring at right angles to said spindle only and for holding said ring in an eccentric position to which it may be so shifted.

12. In a gauging device for determining conditions of dynamic unbalance in rotatable bodies, in combination with a rotatable spindle, a wheel support carried and rotatably drivable by the spindle but universally rockable with respect thereto, an element encircling and rotatable with the spindle but slidable laterally to positions of varying eccentricity with relation to the axis of the spindle, means carried by said spindle for constraining movement of said element at right angles only to said spindle, said element being operatively connectible to and shiftable by the wheel support and electrical contact means operable by said shiftable element.

SIDNEY W. MARTIN.

References Cited in the file of this patent

UNITED STATES PATENTS

| Number | Name | Date |
|---|---|---|
| 2,316,524 | Martin | Apr. 13, 1943 |
| 2,322,939 | Inman | June 29, 1943 |
| 2,378,018 | Inman | June 12, 1945 |
| 2,553,058 | Martin | May 15, 1951 |